United States Patent [19]
Yamaya et al.

[11] Patent Number: 5,739,427
[45] Date of Patent: Apr. 14, 1998

[54] PLATE CIRCULATOR AND FORCE MEASURING APPARATUS

[75] Inventors: Kenziro Yamaya; Yutaka Naruse; Yukio Uchino, all of Tokyo, Japan

[73] Assignees: Bridgestone Corporation; Daiwa Manufacture Corporation, both of Tokyo, Japan

[21] Appl. No.: 739,747

[22] Filed: Oct. 29, 1996

[30] Foreign Application Priority Data

Nov. 1, 1995 [JP] Japan ................... 7-285047

[51] Int. Cl.$^6$ ........................................ G01L 3/26
[52] U.S. Cl. .............................. 73/117; 73/118.1
[58] Field of Search ................. 73/146, 117, 117.2, 73/117.3, 118.1

[56] References Cited

U.S. PATENT DOCUMENTS

| | | | |
|---|---|---|---|
| 3,823,485 | 7/1974 | Lambecht | 73/117 |
| 3,886,788 | 6/1975 | Jeter, Jr. | 73/117 |
| 4,862,737 | 9/1989 | Langer | 73/117 |
| 4,998,436 | 3/1991 | Kaizu et al. | 73/117 |

Primary Examiner—George M. Dombroske
Assistant Examiner—Max H. Noori
Attorney, Agent, or Firm—Sughrue, Mion, Zinn, Macpeak & Seas, PLLC

[57] ABSTRACT

A plate circulator includes a plurality of plates, chaining means forming a circular body by connecting the plates in a loop, an engagement groove provided to surfaces of each plate in the circular body, a guide member having a receiving groove, a frame to which a guide member is fixed so that the receiving groove faces the engagement groove, a plurality of balls disposed between the plates and the guide members so as to be brought into contact with the engagement groove and the receiving groove and support the circular body, a circulation groove for rotating and circulating the plurality of balls, and a power transmitting device for circulating the circular body. Therefore, the arrangement can be made simple, the plane formed by the plates can be made high accurate and the apparatus can be made small at the same time.

18 Claims, 9 Drawing Sheets

PLATE CIRCULATOR AND FORCE MEASURING APPARATUS

BACKGROUND OF THE INVENTION

1. Field of the Invention

The present invention relates to a plate circulator which circulates plates to which a load is being applied and it also relates to a force measuring apparatus. More specifically, the plate circulator and the force measuring apparatus are capable of forming a continuous plane so that release of a force towards a circulating axial direction where a plate is circulated becomes small, and are capable of circulating the plates smoothly and accurately. Such a plate circulator and force measuring apparatus are suitable for measuring a rotating state of wheels of a vehicle. The plate circulator and force measuring apparatus are suitable for, for example, measuring a force which is exerted between tires as wheels and the surface of a road, a force which is generated due to deformation of a tire contact surface such as its footprint which causes uneven wear of the tires, etc.

2. Description of the Related Art

In general, in order to obtain running stability of a vehicle, a camber angle is provided to wheels. In order to prevent uneven wear due to the provision of the camber angle, a tow angle is provided thereto. On the contrary, in order to balance forces generated on front tires and rear tires of a vehicle to obtain the running stability of the vehicle, a toe angle is provided. In order to prevent uneven wear due to the provision of the toe angle, a camber angle is provided. Alternatively by combining the toe angle and the camber angle, an adjustment is made so that the running stability is obtained and the uneven wear of tires is minimized under conditions which are restricted by a structure, dimension, etc. of a vehicle.

As mentioned above, in order improve the running stability of a vehicle and the uneven wear resistance of a tire, it is important to adjust the toe angle and the camber angle which are attitude angles applied to each wheel.

In addition, an adjusting method which provides more accurate running stability and wear resistance is required to satisfy the requirements of high speed and high straight running stability of a recent vehicle, but in order to realize this, it is required to establish the adjusting method based upon the characteristics of a tire. As the conventional adjusting method which pays attention to the characteristic of the tire, a technique for driving wheels by using at least two pairs of rollers and measuring forces generated on the rollers and measuring the toe angle and the camber angle based upon the directions of the measured forces is known (Japanese Patent Application Publication (JP-B) No. 51-1868).

However, it is confirmed that the force which is generated when a tire is brought into contact with a road surface varies with the contact configuration of the tire at the time of contact with the road surface. Accordingly, since the contact configuration of the tire brought into contact with the rollers is greatly different from the contact configuration of the tire in contact with the road surface which can be substantially plane, the characteristics of the generated forces are different on the rollers and the surface of the road.

Therefore, since the measured forces of the wheels brought into contact with the rollers are different from forces of the wheels generated when the tires are brought into contact with an actual road surface, the data obtained by the above conventional technique does not has versatility as actual data. For this reason, a technique for moving or driving a plane in one direction to rotate wheels, etc. to be measured which is placed on the plane is considered.

Examples of the mechanism of moving or driving a plane in one direction to rotate or transport a body to be measured which is placed on the plane are a mechanism of reciprocating a long plate, a mechanism of circulating a belt and a mechanism of connecting a plurality of plates by a chain or the like to circulate the plates.

Since the first mechanism of reciprocating a long plate uses a long plate, in the case where wheels or the like to be measured are rotated, the rotatable distance of the wheels on the plate is limited. As a result, this mechanism has a disadvantage that its size becomes larger.

The second mechanism of circulating a belt requires a supporting mechanism for supporting a belt portion which forms a plane so that this portion is kept plane, and the supporting mechanism should have a plane whose surface is smooth and whose friction to the belt is very small. Particularly under conditions where the pressure is more than 2 $Kg/cm^2$ and a maximum load is 1 t, the second mechanism has a disadvantage that expensive and large-sized accessories such as a water bearing and an air bearing should be used as the supporting mechanism. Moreover, it is difficult to minimize deflection of the belt with respect to a force along the driving axial direction of the belt.

The third mechanism of connecting a plurality of plates by a chain or the like to circulate the plates overcomes the disadvantages of the first and second mechanisms by a roller or a bearing which supports the plates connected in a loop configuration. However, in order to form a plane by using the plates during the circulating operation of the plates, each plate should be provided with a roller or a bearing, or a plurality of rollers or bearings are disposed so as to support the plates without deteriorating a plane characteristic formed by the plates. As a result, the third mechanism has a disadvantage that the structure becomes complicated because of use of many rollers and bearings.

Meanwhile, in order to minimize height variations between the plates during a circulation of the plates, in general, both the ends of the plate positioned in directions perpendicular to the moving direction of the plates or portions having the same function as the ends are held between rotating bodies such as rollers or guides such as guide plates.

However, in this structure, it is necessary to apply a pre-load between the guides and the both ends of the plates. For this reason, when the plates are circulated, small collisions may be caused between the guides and the plates. As a result, this structure has a disadvantage that a smooth circulation of the plates is disturbed because resistance is generated due to the collisions.

SUMMARY OF THE INVENTION

It is an object of the present invention to provide a plate circulator and a force measuring apparatus in which the arrangement is made simple and a plane is formed by plates in high accuracy, and which can be made small.

More specifically, the plate circulator and the force measuring apparatus have a function for supporting plates which are connected in a loop shape through balls and a receiving groove for receiving a load, etc. while the balls are being circulated, a function for minimizing displacement of the plates or variations in the heights of the plates and a function for supporting the load applied to the plates so as to circulate the plates smoothly A plate circulator according to one aspect of the present invention has: a plurality of plates; chaining means for forming a circular body by connecting the plurality of plates in parallel so that the plates can be circulated; an engagement groove provided to a surface of each plate in the circular body to be extended in a direction along the circular body; a guide member provided to be extended in the direction along the circular body, the guide member having a receiving groove; a frame to which said guide member is fixed so that the receiving groove faces the engagement groove; a plurality of balls for supporting the circular body, disposed between the plates and the guide member to be brought into contact with walls constituting the engagement groove and the receiving groove; a circulation groove for rotating and circulating the plurality of balls, the circulation groove being connected to the engagement groove and the receiving groove; and power transmitting means for transmitting a power to the chaining means so as to circulate the circular body.

The following functions are produced by the above plate circulator.

The chaining means forms the circular body by connecting the plurality of plates in parallel so that the plates can be circulated, and the power transmitting means transmits a power to the chaining means so as to circulate the circular body.

In addition, the engagement groove, which is extended in the direction along the circular body, is provided respectively to the surfaces of each plate in the circular body. The guide member is fixed to the frame so that the receiving groove faces the engagement groove, and the plurality of balls are disposed between the plates and the guide members to be brought into point-contact with walls constituting the engagement groove and the receiving groove and support the circular body. Moreover, when the balls rotates and moves in the circulation groove, the balls are circulated in the portion between the engagement groove and the receiving groove and in the circulation groove.

Therefore, the plate circulator has the function for supporting the connected plates by the balls and members having the grooves in which the balls are circulated, the function for minimizing displacement of the plates, or variation in height thereof, and the function for supporting a load applied to the plates to circulate the plates smoothly. Then, since the plate circulator has the balls, the engagement groove, the receiving groove and the circulation groove, the arrangement can be made simple, the plane formed by the surfaces of the plates can be made highly accurate, and the apparatus can be made small.

A plate circulator according to another aspect of the present invention has: a plurality of plates: chaining means for forming a circular body by connecting the plurality of plates in parallel so that the plates can be circulated; an engagement groove provided to a surface of each plate in the circular body to be extended in a direction along the circular body, the engagement groove having a V-shaped cross section; a guide member provided to be extended in the direction along the circular body, the guide member having a receiving groove having a V-shaped cross section: a frame to which the guide member is fixed so that the receiving groove faces the engagement groove; a plurality of balls for supporting the circular body, disposed between the plates and the guide member to be brought into contact with walls constituting the engagement groove and the receiving groove; a circulation groove for rotating and circulating the plurality of balls, the circulation groove being connected to the engagement groove and the receiving groove; and power transmitting means for transmitting a power to the chaining means to circulate the circular body.

The following functions are produced by the above plate circulator.

Since the above plate circulator has the same arrangement as the first embodiment, the same functions as the first embodiment are produced. However, since the engagement groove and the receiving groove have the V-shaped cross section, the balls are brought into contact with point-contact with walls constituting the engagement groove and the receiving groove more suitably, and thus the transmission of the load from the balls to the guide members and the rotation or circulation of the balls become satisfactory.

A force measuring apparatus of another aspect of the present invention has: a plurality of plates; chaining means for forming a circular body by connecting the plurality of plates in parallel so that the plates can be circulated; an engagement groove provided to a surface of each plate in the circular body to be extended in a direction along the circular body; a guide member provided to be extended in the direction along the circular body, the guide member having a receiving groove; a frame to which said guide member is fixed so that the receiving groove faces the engagement groove; a plurality of balls for supporting the circular body, disposed between the plates and the guide members to be brought into contact with walls constituting the engagement groove and the receiving groove; a circulation groove for rotating and circulating the plurality of balls, the circulation groove being connected to the engagement groove and the receiving groove; power transmitting means for transmitting a power to the chaining means so as to circulate the circular body; and a force sensor for detecting a force to be transmitted from the plates to the frame, the force sensor being provided to a lower portion of the frame.

The following functions are produced by the above force measuring apparatus.

Since the force measuring apparatus has the same arrangement as the first embodiment, the same functions as the first embodiment are produced. However, since the force measuring apparatus has the force sensor for detecting a force transmitted from the plates to the frame, the force to be applied to the plates can be detected easily by the simple mechanism.

For a fuller understanding of the nature and advantages of the invention, reference should be made to the ensuing detailed description taken in conjunction with the accompanying drawings.

DETAILED DESCRIPTION OF THE PREFERRED EMBODIMENT

Figure 1:
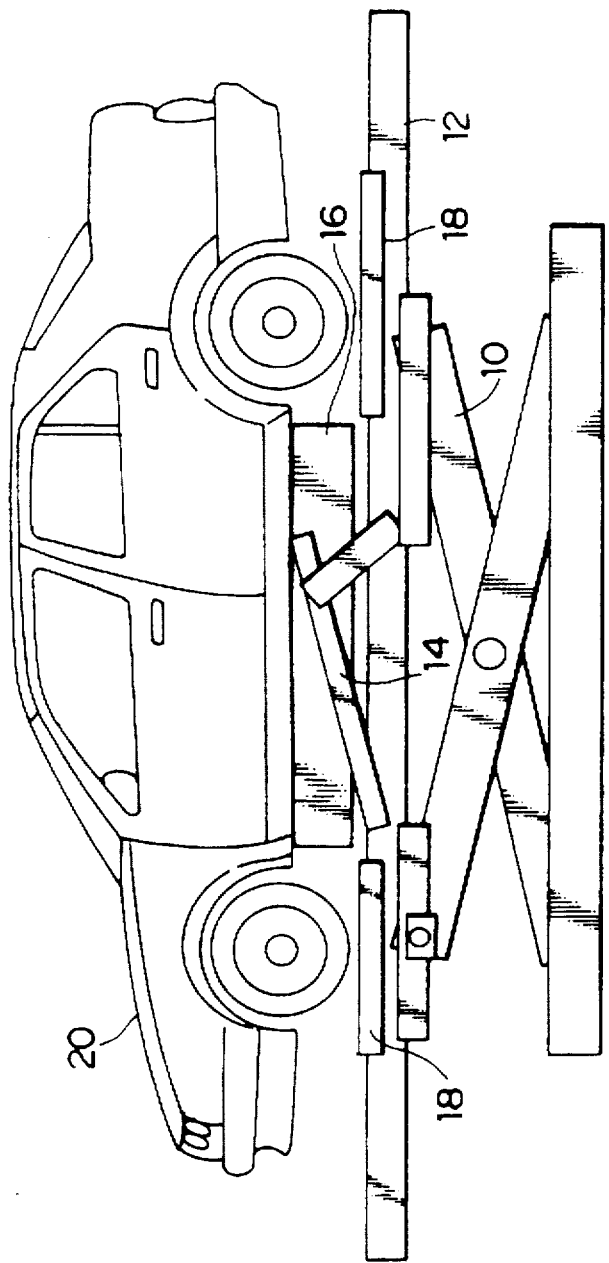
FIG. 1 is a side view which shows a measuring apparatus according to one embodiment of the present invention.
Figure 2:
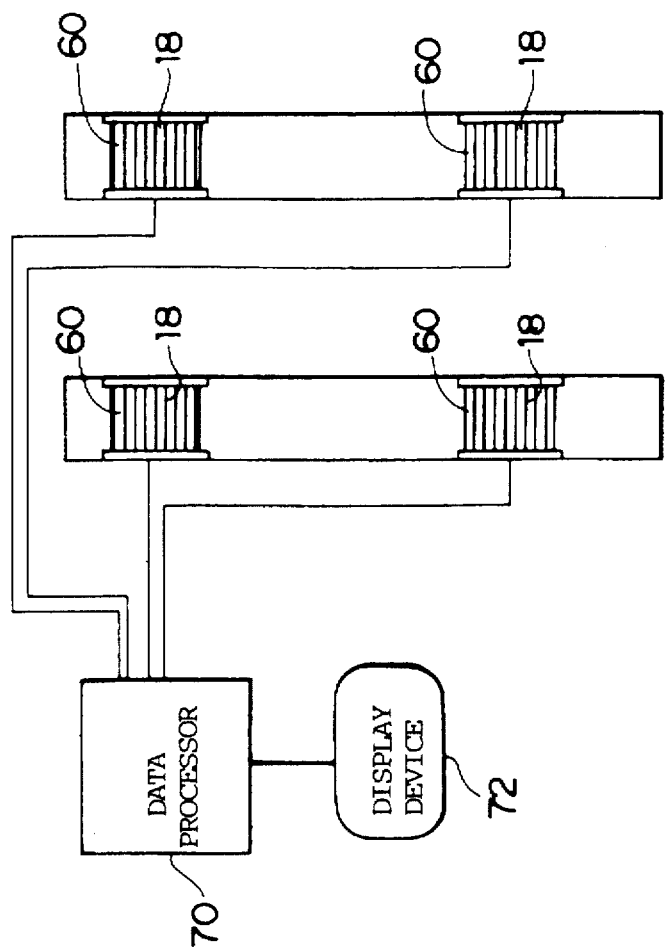
FIG. 2 is a schematic plan view which shows the measuring apparatus according to one embodiment of the present invention.

The following describes one embodiment of a plate circulator and a force measuring apparatus of the present invention on reference to the drawings. FIGS. 1 and 2 show the measuring apparatus for measuring a force of a wheel of a vehicle according to the present embodiment.

The measuring apparatus for measuring a force of a wheel is provided with a supporting stand 12 which is raised and lowered by means of a main raising lowering unit 10, and a vehicle receiving board 16 which rises and falls from the supporting stand 12 by means of a sub rising/lowering unit, or jack, 14. Four tire driving apparatuses 18 for rotating each wheel are mounted to the supporting stand 12, and the tire driving apparatuses 18 constitutes the plate circulator and the force measuring unit. The four tire driving apparatuses 18 include a pair of tire driving apparatuses 18 for rotating the front wheels and a pair of tire driving apparatuses 18 for rotating the rear wheels.

Figure 5:
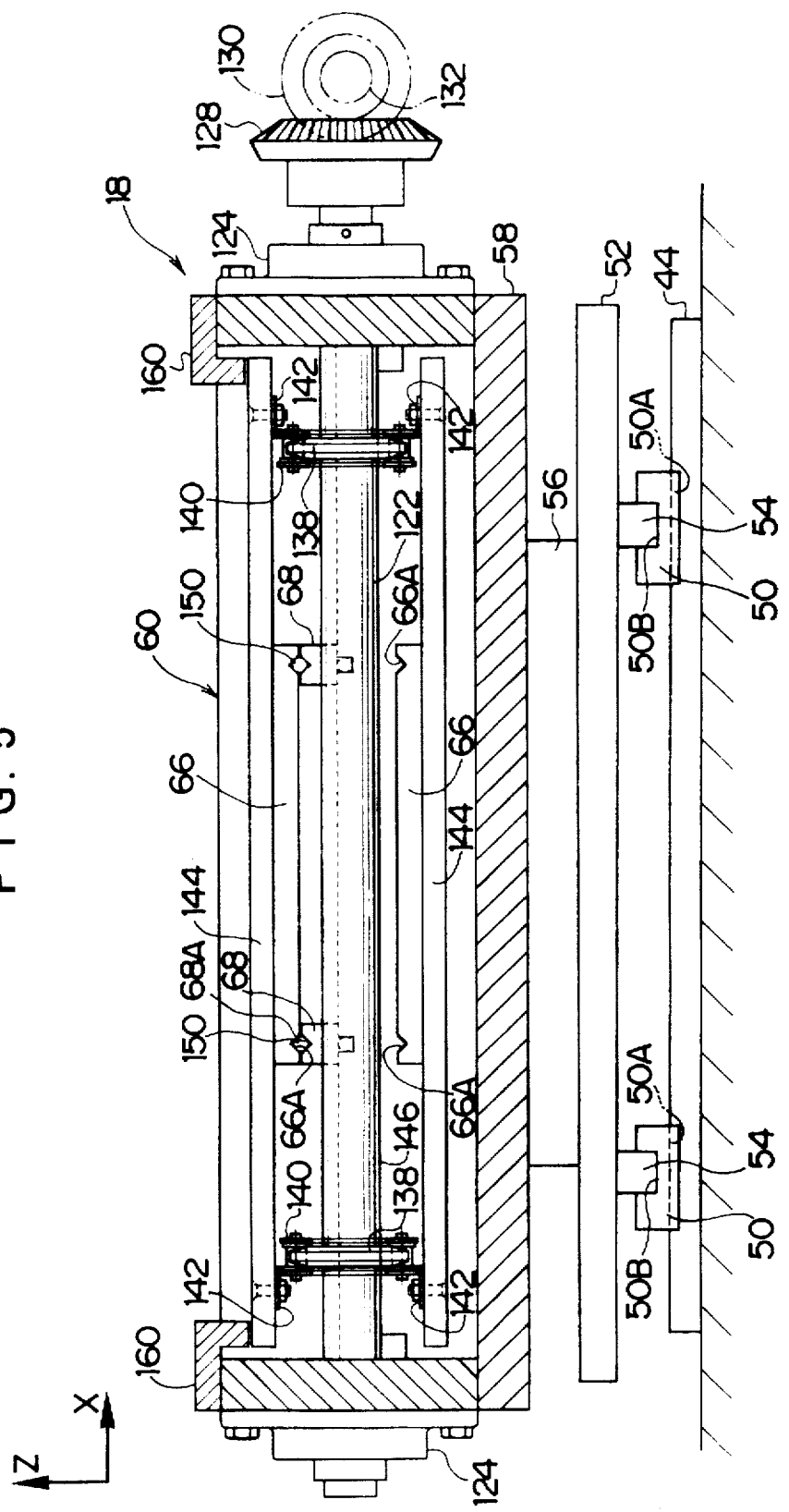
FIG. 5 is a front cross sectional view which shows the tire driving apparatus according to one embodiment of the present invention.
Figure 7:
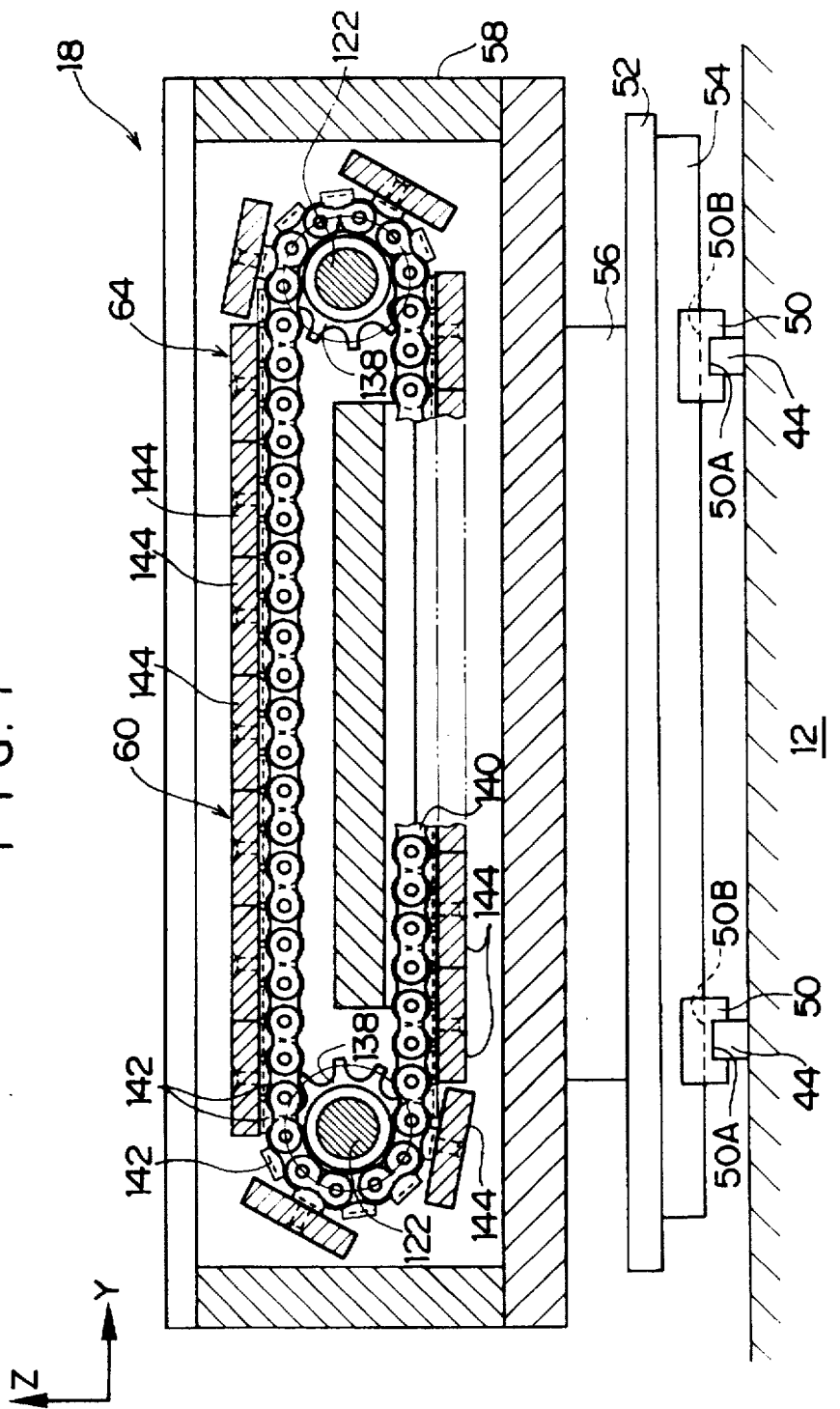
FIG. 7 is a side cross sectional view which shows the tire driving apparatus according to one embodiment of the present invention.
Figure 8:
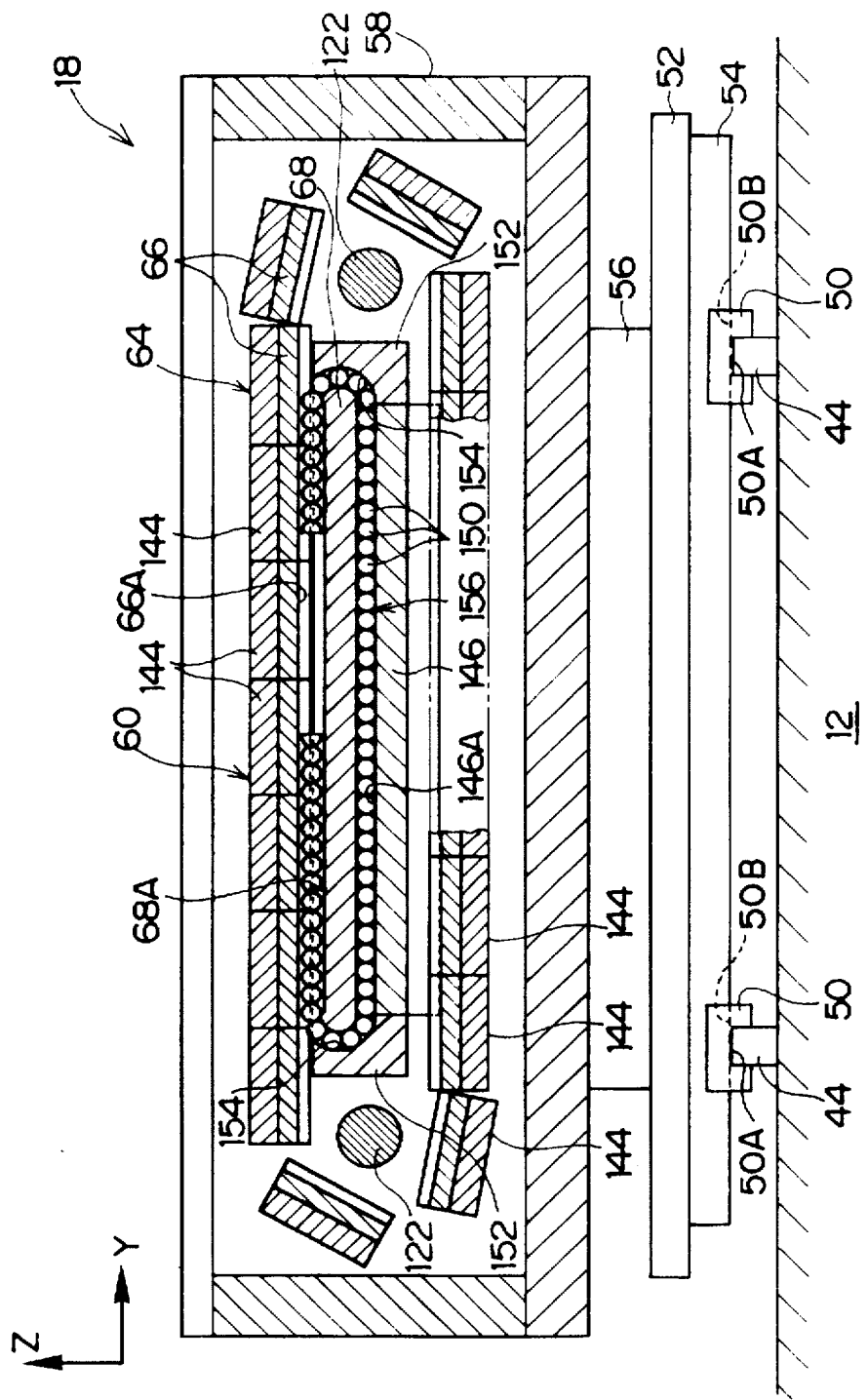
FIG. 8 is another side cross sectional view which shows the tire driving apparatus according to one embodiment of the present invention.

Since the four tire driving apparatuses 18 shown in FIGS. 1 and 2 have the same arrangement, the description will be given as to one tire driving apparatus 18. As shown in FIGS. 5, 7 and 8, the tire driving apparatus 18 has a pair of right/left sliding guide rails 44 which are fixed to the supporting stand 12 to be extended parallel with a widthwise direction of a vehicle 20, namely, the right-left direction.

A pair of right/left moving members 50 is fitted onto the right/left sliding guide rail 44. Namely, a groove 50A is formed on the lower surface of the right/left moving member 50 and the right/left moving member 50 is fitted onto the right/left sliding guide rail 44 through the groove 50A so that the right/left moving members 50 can move only in a direction along the right/left sliding guide rail 44. A groove 50B, which is extended in a direction which perpendicularly cross the right/left sliding guide rail 44 is formed on the upper surface of the right/left moving member 50.

A force sensor mounting plate 52 is placed above the right/left moving member 50. A pair of front/rear sliding guide rails 54 are fixed to the bottom of the force sensor mounting plate 52 to be extended in a direction which perpendicularly crosses the right/left sliding guide rail 44, namely, parallel with the longitudinal direction of the vehicle 20.

The front/rear sliding guide rail 54 is fitted into the right/left moving member 50 in the groove 50B to be movable relatively only in the longitudinal direction of the vehicle.

A force sensor 56 fixed to the upper surface of the force sensor mounting plate 52 is provided with a force detecting element such as a distortion gauge and a load cell, and the force sensor 56 is capable of detecting force magnitudes in the right-left direction of the vehicle 20 (shown by an arrow X), the front-rear direction of the vehicle 20 (shown by an arrow Y) and the vertical direction of the vehicle 20 (shown by an arrow Z) which is a direction where a load is applied, and detecting force directions.

Four screw holes (not shown) for mounting the force sensor 56 to the force sensor mounting plate 52 are drilled on the force sensor 56, and four screw holes (not shown) for mounting the force sensor 56 to the bottom surface of a frame 58 forming an outer frame of the tire driver 18 are drilled on the force sensor 56. The force sensor 56 is fixed to the upper surface of the force sensor mounting plate 52 and to the bottom surface of the frame 58 by screws, not shown.

Figure 3:
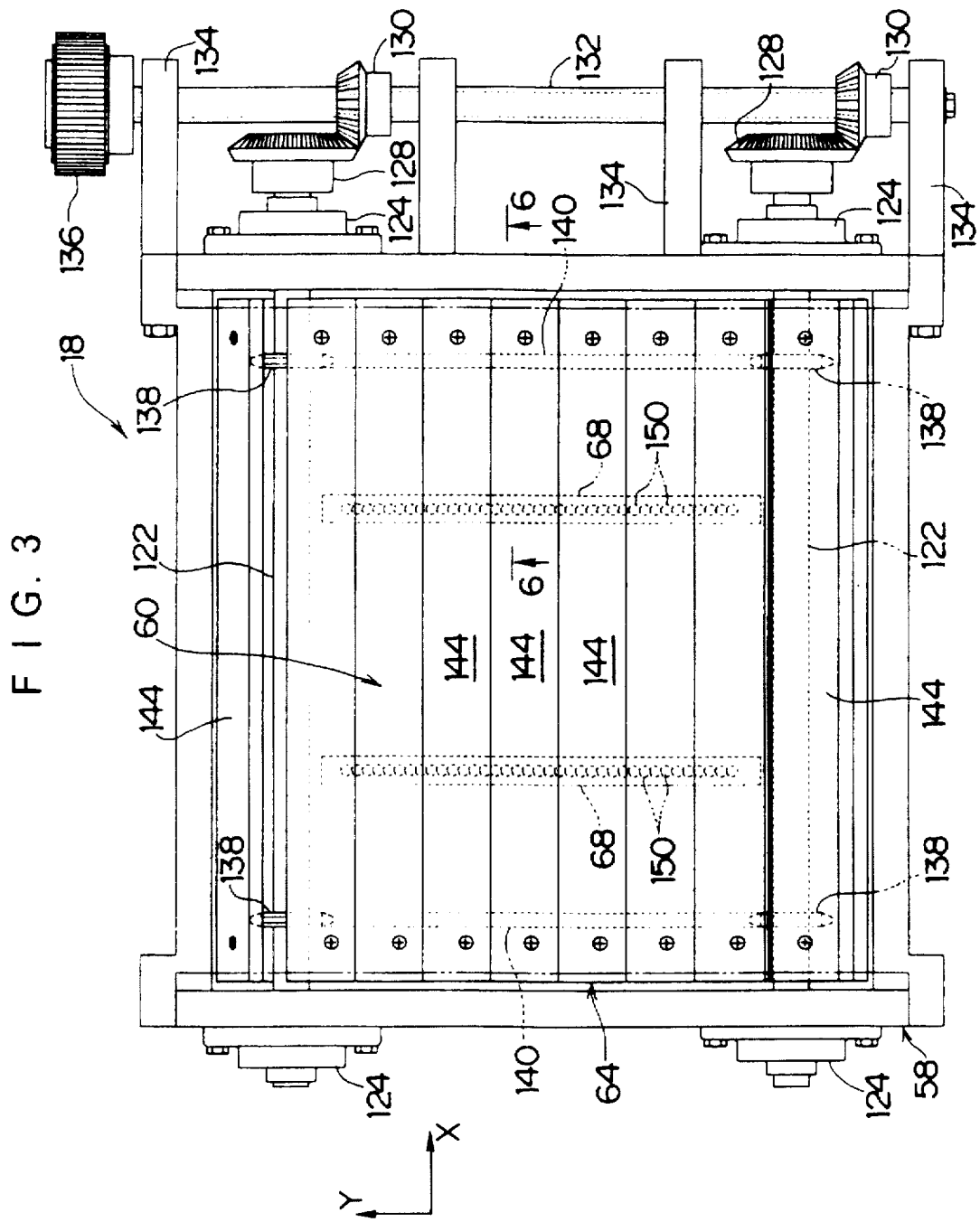
FIG. 3 is a plan view which shows a tire driving apparatus according to one embodiment of the present invention.
Figure 4:
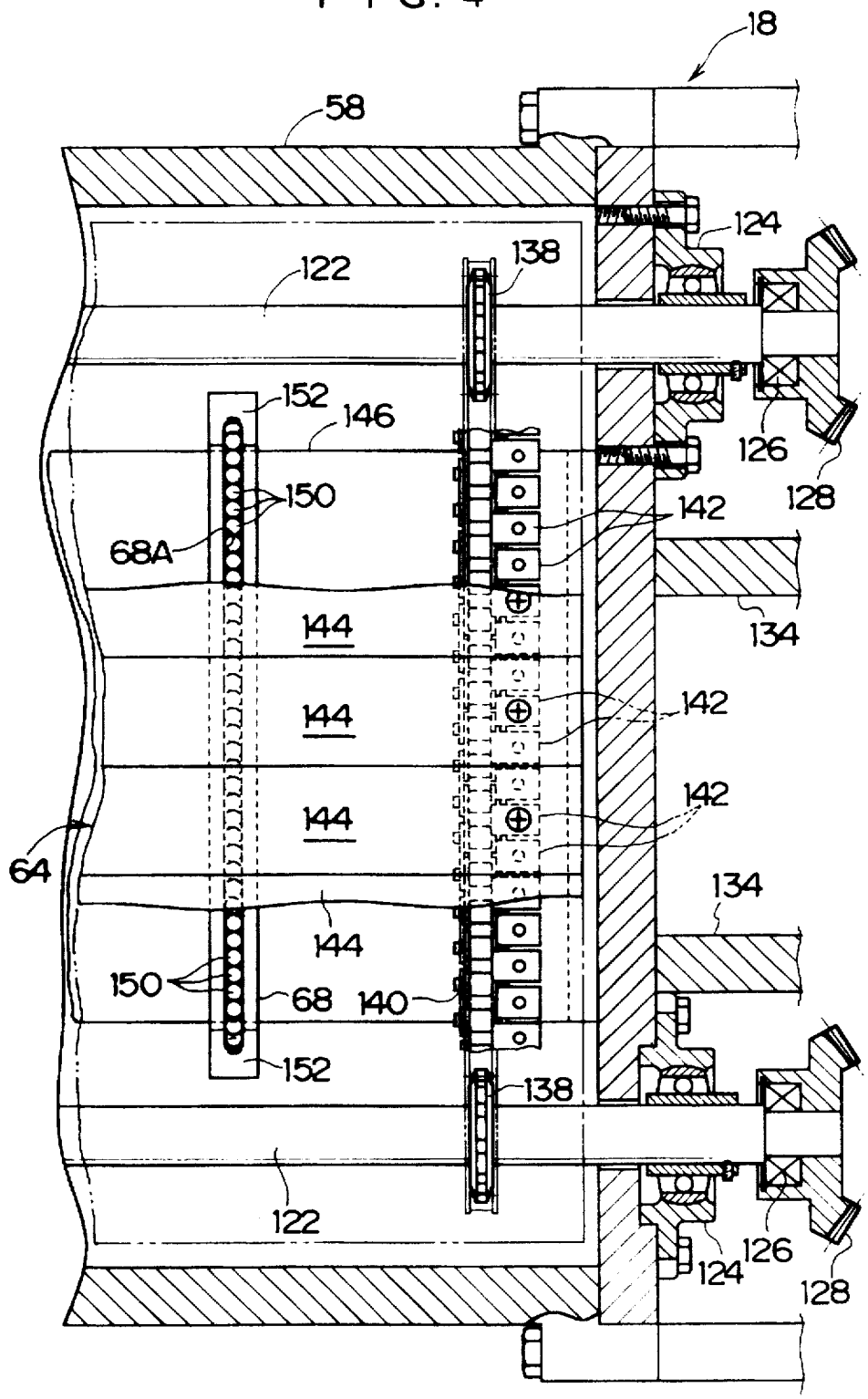
FIG. 4 is a cross sectional view which shows an enlarged main section in FIG. 3.

As shown in FIGS. 3 and 4, a pair of driving shafts 122 are supported on the frame 58 of the tire driving apparatus 18 to be parallel with each other. The driving shafts 122 stretch over both side plates of the frame 58, and they can be rotated via bearings 124. Bevel gears 128 are respectively provided on one end of the driving shafts 122 via one way clutches 126 (shown in FIG. 4). A pair of bevel gears 130, which mesh with the bevel gears 128 respectively, are fixed to a transmitting shaft 132 which is rotatably supported on a pair of brackets 134 which are extended from the frame 58 via bearings (not shown).

In addition, a spur gear 136 is provided to one end of the transmitting shaft 132, and an output gear of a motor (not shown) for rotating the driving shaft 122 meshes with the spur gear 136. Therefore, the rotation of the motor is transmitted to the spur gear 136 so that the pair of driving shafts 122 are rotated through the rotation of the transmitting shaft 132.

In addition, two sprockets 138 as power transmitting means are provided to the respective driving shafts 122 such that each sprocket 138 mounted on one of the shafts 122 is opposed to a corresponding sprocket 138 of the other. A pair of chains 140 as chaining means are entrained around the sprockets 138 respectively to be spanned between the driving shafts 122. For this reason, the sprockets 138 rotate the chains 140 according to the rotation of the driving shafts 122.

Figure 6:
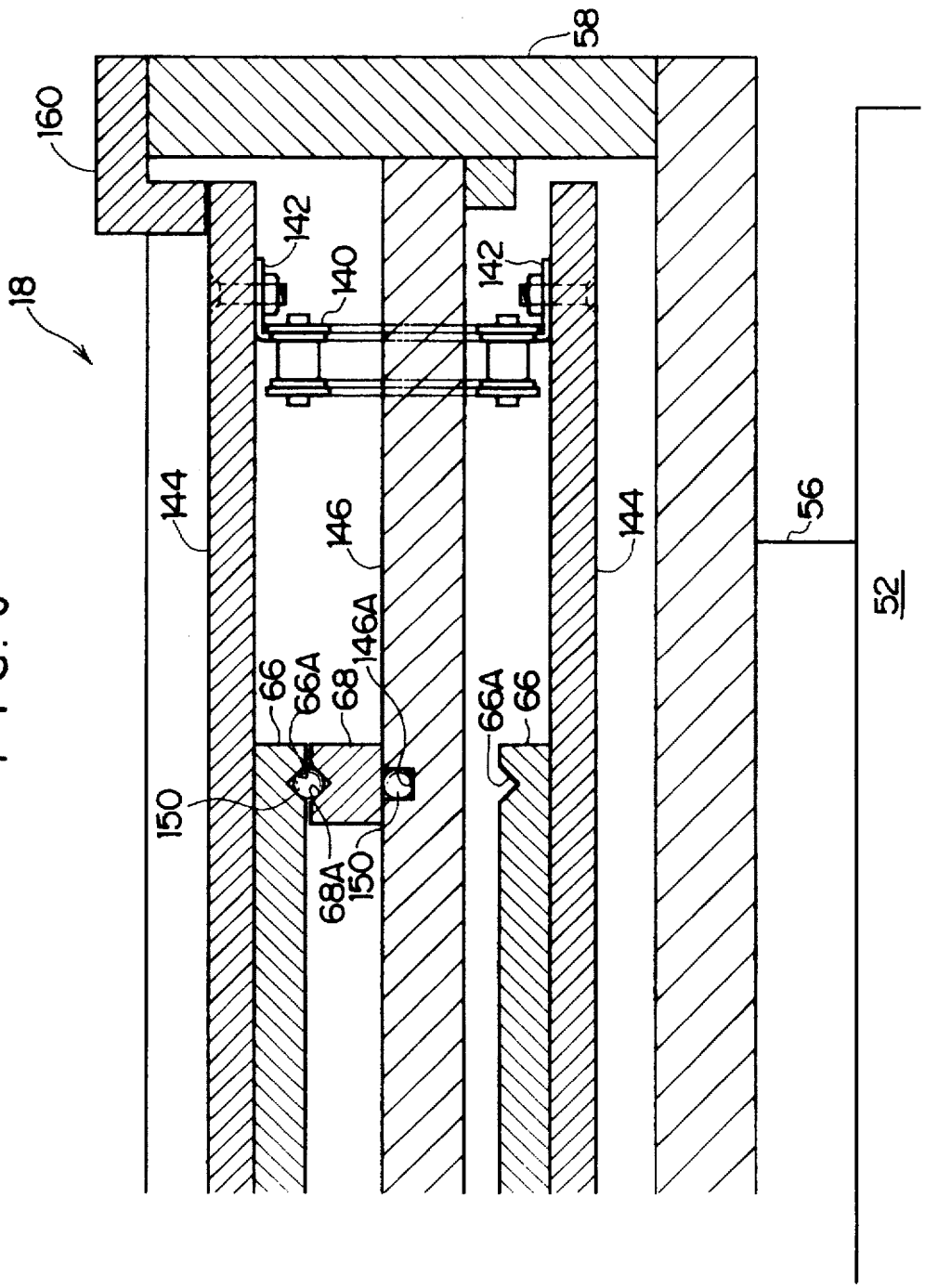
FIG. 6 is a cross sectional view taken along a line 6—6 of FIG. 3.

As shown in FIGS. 4 through 6, a plurality of connecting members 142 are mounted to the chains 140 along a longitudinal direction of the chains 140. Plate pieces 144 are screwed on the connecting members 142 respectively. The plate pieces are made of a long and narrow aluminum plate having a longer length than a width of the tire, and a width such that the plate pieces do not get into grooves of a tread pattern of the tire.

Therefore, as shown in FIG. 7, the plate pieces 144 are connected along the widthwise direction by the chains 140 and the connecting members 142 to constitute crawler 64 as a circular body. The crawler 64 entrains the pair of driving shafts 122 so that the longitudinal direction of the plate piece 144 faces the transverse of the vehicle 20. Namely, since the pair of driving shafts 122 are rotatably supported on the frame 58, the crawler 64 will be supported on the frame 58 to be able to circulate.

In addition, a supplementary body 160 made of MC nylon is provided as shown in FIGS. 5 and 6, on the upper portion of the frame 58, and the supplementary body 160 maintains the upper surfaces of the plate pieces 144 to guide crawler 64 at the time of the circulation.

As shown in FIGS. 5 and 6, a quenched plate guide 66 made of steel is mounted to a central portion of the inner surface of each plate piece 144 constituting the crawler 64. A pair of engagement grooves 66A, which are extended in the direction along the crawler 64, are provided to the plate guide 66 in parallel.

In addition, a load receiving plate member 146 is fixed to the frame 58 to be spanned between the side plates of the frame 58, and a pair of quenched guide members 68 made of steel are fixed to positions which face the engagement grooves 66A on the upper surface of the load receiving plate member 146. A receiving groove 68A, which is extended in the direction along the crawler 64, is provided to the position on the surface of the guide member 68 which faces the engagement groove 66A.

The engagement groove 66A and the receiving groove 68A are formed in a V-shape having an angle of 90° and a plurality of balls 150, which are made of steel and processed or machined accurately to have the same size, are placed continuously between the engagement groove 66A and the receiving groove 68A.

Therefore, the guide member 68 supports the load applied onto the plate piece 144 through the balls 150, and supports the continued plate pieces 144 so that the plate pieces 144 are flush with each other. Accordingly, when a force is applied onto the receiving groove 68A of the guide member 68, the load receiving plate member 146 receives the force, and the force applied to the load receiving plate member 146 is supported by the frame 58. Then, the force sensor 56 fixed to the frame 58 detects magnitude and direction of the force applied to the frame 58.

In addition, as shown in FIGS. 6 and 8, a rectangular groove 146A which has such a size that the balls 150 pass therethrough is formed in a section which is on the upper surface of the load receiving plate member 146 and is covered with the guide member 68. As shown in FIG. 8, passage forming members 152 is provided to forward and backward ends of the load receiving passage forming 46. The passage forming member 152 forms an U-shaped groove 154 which connects between a passage between the engagement groove 66A and the receiving groove 68A, and a passage of the rectangular groove 146A.

For this reason, a circulation groove 156, which is formed by the passage between the engagement groove 66A and the receiving groove 68A, the rectangular groove 146A, and the U-shaped groove 154 is provided to rotate and circulate the plurality of balls 150. Then, the balls 150 rotate and move in the circulation groove 156 so as to be circulated and supplied onto the guide member 68 again.

As mentioned above, since the balls 150 sandwiched between the engagement groove 66A of the plate guide 66 and the receiving groove 68A of the guide member 68 determine the relative position between the plate guide 66 and the guide member 68, and the balls 150 receive the forces in the perpendicular direction and in the direction along the driving shaft 122 which are applied to the plate pieces 144, it is possible to make the plate guide 66 out of contact with the guide member 68, and thus slide resistance between the plate guide 66 and the guide member 68 can be decreased.

Therefore, the plurality of plate pieces 144 composing the crawler 64 are supported by the plurality of balls 150 to form a tire driving surface 60 which drives the wheel on the upper surface of the tire driving apparatus 18.

As shown in FIG. 2, each motor of the tire driving apparatuses 18 is connected to a data processor 70, which is composed of a personal computer, etc., to control their rotating direction, and each force sensor 56 of the tire driving apparatuses 18 is connected to the data processor 70 so that a detecting value can be inputted thereto. Here, these connections are shown by one wire for each in FIG. 2. The data processor 70 is connected to a display unit 72 which is composed of CRT, etc. for displaying the detected values of the force sensors 56, force magnitude to be adjusted, etc.

When the motor of the tire driving apparatus 18 is rotated, the crawler 64 is circulated in the direction which is perpendicular to the driving shaft 122 about the pair of driving shafts 122 as the circulating shafts of the crawler 64. Then, the circulating direction of the pair of tire driving surfaces 60 on which the front wheels are disposed is parallel with the circulating direction of the pair of tire driving surfaces 60 on which the rear wheels are disposed. The circulating direction of the tire driving surfaces 60 on which the front tires are disposed is the same as the circulating direction of the tire driving surfaces 60 on which the rear wheels are disposed.

In addition, since the tire driving apparatuses 18 have the above arrangement, the tire driving surfaces 60 can move in the transverse direction along the right/left sliding guide rails 44, and can move in the front-rear, or longitudinal, direction along the front/rear sliding guide rail 54. Moreover, the position of each tire driving surface 60 can be adjusted according to a type of a vehicle by moving the tire driving surfaces 60 in the right-left and front-rear directions and locking the tire driving surfaces 60 by means of locking means (not shown).

Figure 9A:
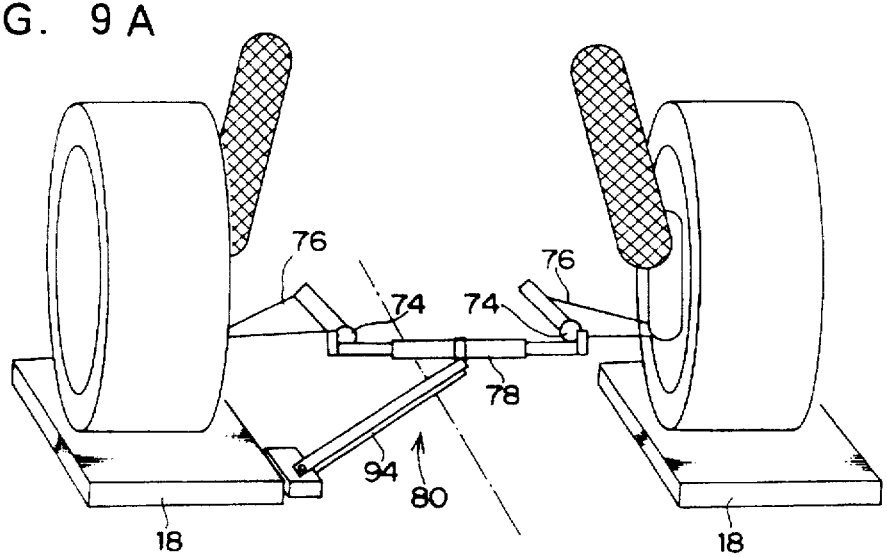
FIG. 9A is a schematic drawing which shows a state that a stopper is mounted to a vehicle.

FIG. 9A illustrates a stopper 80 for supporting the vehicle 20 placed on the measuring apparatus for measuring forces of the wheels so that the vehicle 20 do not move. The stopper 80 is provided with a fitting 78 which is mounted to a pivot 74 provided to a lower arm 76 of a suspension.

Figure 9B:
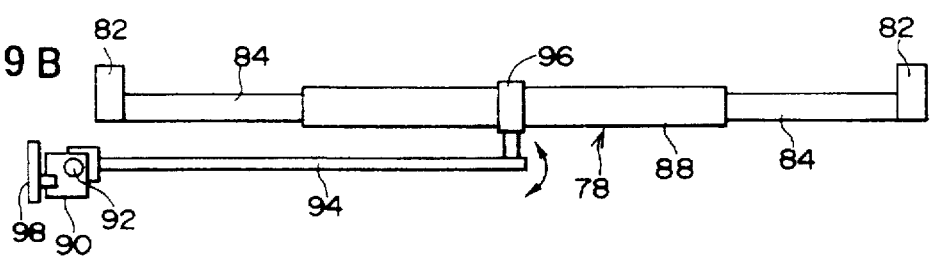
FIG. 9B is a schematic view of the stopper.
Figure 9C:
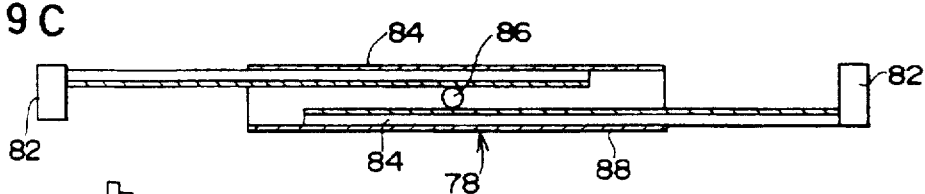
FIG. 9C is a cross sectional view of fittings of the stopper.

As shown in FIG. 9C, the fitting 78 is provided with a pair of rack gears 84 whose one end is provided with a clamp 82 which clamps the pivot 74 or a portion of the lower arm 76 in the proximity of the pivot 74 and other end is stored in a cylinder 88. Moreover, the fitting 78 is provided with a pinion gear 86 which is engaged with a pair of rack gears 84 in the cylinder 88. The illustration of the tooth of these rack gears 84 and the pinion gear 86 is omitted.

Since the fitting 78 is provided with a pair of rack gears 84 and the pinion gear 86 which are engaged with each other, an interval of a pair of clamps 82 can be adjusted by moving the pair of rack gears 84 in the longitudinal direction.

Figure 9D:
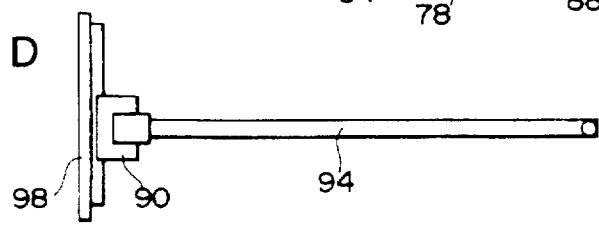
FIG. 9D is a schematic view which shows a proximity of a base of the stopper.

As shown in FIG. 9B, a middle portion of the fitting 78 is retained by a clamp 96 provided on one end of a supporting rod 94. As shown in FIGS. 9B and 9D, the other end of the supporting rod 94 is supported by a base stand 90 to rotate about a supporting point 92 only in a plane which perpendicularly cross the longitudinal direction of a slide rail 98. The base stand 90 is mounted to the slide rail 98 able to slide along the slide rail 98. The base stand 90 can be fixed at an arbitrary position in the longitudinal direction of the slide rail 98.

The wheels are disposed on the tire driving surfaces 60 of the tire driving apparatuses 18, one of the wheels is rotated by one of the tire driving apparatuses 18. As a result, the forces in the right-left direction of the vehicle 20, namely, the circulation axial direction, and the front-rear direction of the vehicle 20, namely, the circulating direction are exerted on the plate pieces 144 by the rotating tire.

The forces are transmitted to the frame 58 via the engagement groove 66A of the plate guide 66, the balls 150, the receiving groove 68A of the guide member 68 and the load receiving plate member 146, and the force sensors 56 can detect the magnitudes and the directions of the forces.

The forces which can be detected here are, generated at the time of rotation of the wheel, and examples of the forces are a force due to toe, and forces of a ply steer, camber thrust, conicity, etc.

The following describes a measurement of a force at the time of rotation of the wheel using the measuring apparatus for measuring the forces of the wheel.

First, a steering wheel of the vehicle 20 is set in the straight traveling state of the vehicle, and the direction of the vehicle is adjusted so that an approximately central line of the vehicle is parallel with the forward circulating direction of each tire driving surface 60. Here, in the case where the vehicle 20 is put on the tire driving surfaces 60, it is preferable that each tire driving apparatus 18 is locked by the locking means so as not to move.

Next, the vehicle 20 to be measured is placed on the supporting stand 12 with the slide rail 98 of the stopper 80 extending in the front-rear direction of the vehicle 20, and the vehicle 20 is clamped and fixed. As a result, the vehicle 20 is prevented from moving the front-back direction. In this case, it is necessary to prevent the forces in the front-rear and right-left and up-down directions which are generated without the driving of the wheels from exerting on the body of the vehicle by fixing.

Thereafter, the tire driving surface 60 of one tire driver 18 is circulated so that one wheel is rotated forward, and at this time, data at the time of the forward rotation of the wheel detected by the force sensor 56 are stored in a memory of the data processor 70. Moreover, the same wheel is reversely rotated, and data at the time of the reverse rotation of the wheel detected by the force sensor 56 are stored in the memory of the data processor 70.

Then, these processes are repeated so that the data at the times of the forward rotations of the four wheels and the data at the time of the reverse rotations thereof are sampled.

When the forces of the wheels of the vehicle 20 are measured through the above processes, and adjustment is made, the vehicle 20 and the tires can be adjusted to the most suitable states, and unnecessary forces are not exerted from the surface of a road onto the wheels (tires) at the running situation of the vehicle.

The following describes the operation of the present embodiment.

When the force is measured, the motor of the tire driving apparatus 18 is rotated. According to this rotation, the sprocket 138 is rotated via the rotation of the transmitting shaft 132 and the engagement of the bevel gears 128 and 130. Then, the sprocket 138 transmits power to the chain 140, and the crawler 64, which is arranged by connecting the plurality of plate pieces 144 in the circular configuration, is circulated.

In addition, the engagement groove 66A which extends in the direction along the crawler 64 is formed on the inner surface of the guide plate 66 fixed to each plate pieces 144 inside of the crawler 64, and the guide member 68 is fixed to the frame 58 through the load receiving plate member 146 so that the receiving groove 68A faces the engagement groove 66A. The plurality of balls 150 are brought into point-contact with the walls constituting the engagement groove 66A and the receiving groove 68A, and the crawler 64 is supported by the balls 150 positioned between the plate pieces 144 and the guide member 68. Moreover, the plurality of balls 150 rotate and move in the rectangular groove 146A, and the balls 150 are circulated in the passage between the engagement groove 66A and the receiving groove 68A and the passage of the rectangular groove 146.

Namely, the plurality of balls 150 can be rotated and circulated in the circulation groove 156 formed by the rectangular groove 146A and the U-shaped groove 154.

Therefore, when the crawler 64 is rotated with the load being applied from the vehicle 20, the present embodiment has a function that the connected plate pieces 144 are supported by the guide member 68, the guide plates 66 and the balls 150 circulated therebetween, a function that the variation in the heights of the plate pieces 144 is made minimum, and a function that the load applied to the plate pieces 144 is supported and the balls 150 are circulated smoothly. Since the present embodiment is arranged to have the balls 150, the engagement groove 66A, the receiving groove 68A and the circulation groove 156, the arrangement of the tire driving apparatus 18 can be made simple, the surface composed of the plurality of plate pieces 144 can be made highly accurate, and the apparatus can be made small at the same time.

Since the cross sectional shape of each of the engagement groove 66A and the receiving groove 68A has a V shape, the balls 150 are brought into point-contact with the walls constituting the engagement groove 66A and the receiving groove 68A more suitably, the load is transmitted from the balls 150 to the guide member 68 satisfactorily, and the balls 150 rotates satisfactorily. Therefore, the plate pieces 144 are located along the circulation shaft axial direction by the load of the wheels supported by the plate pieces 144 without applying a pre-load, and the displacement or the height variation of the plate pieces 144 can be made minimum.

In addition, since the force sensor 56 for detecting the force transmitted from the plate pieces 144 to the frame 58 is provided, the force in the right-left direction of the vehicle 20, the force in the front-rear direction of the vehicle 20 and the force in the perpendicular direction which are applied to the plate pieces 144 can be detected easily.

As mentioned above, in the present embodiment, the force in the right-left direction of the vehicle 20, the force in the front-rear direction of the vehicle 20 and the force in the perpendicular direction are supported and the location along the circulation axial direction is made by the balls 150, the engagement groove 66A and the receiving groove 68A. Moreover, in the present embodiment, the plurality of balls 150 are brought into contact with the guide plates 66 fixed to the plate pieces 144 on the load receiving plate member 146. As a result, the plate pieces 144 can be circulated with a difference in inclination between the adjacent plate pieces 144 being kept minimum even under the condition that the load is applied.

The above embodiment explains the present invention as to the measuring apparatus for measuring the forces of the wheels of the vehicle. However, the embodiment can be applied to, for example, a force measuring apparatus for measuring a force in the state that a heavy loaded body is driven at comparatively low speed. Namely, in accordance with the present invention, the load-proofing measuring apparatus, which is larger than another mechanisms and can be used for a test in a comparatively low speed range, can be arranged simply. As a result, the measuring equipment, etc. can be small and light, and its cost can be lowered.

In addition, needless to say, the present invention can be applied to a carrier apparatus, etc. requiring a constant plane. Namely, when a heavy material is carried in a place where a height allowance is small, an apparatus, which has a plane, which can be circulated accurately with a simple mechanism, can be provided. The plate circulator and the force measuring apparatus of the present invention can produces such an effect that the arrangement can be made simple, the plane can be made high accurate, and the apparatus can be made small by the balls and the receiving groove which receives a load while the balls are being circulated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A plate circulator comprising:

a plurality of plates;

chaining means for forming a circular body by connecting the plurality of plates in parallel for circulation;

an engagement groove provided to a surface of each plate in the circular body to be extended in a direction along the circular body;

a guide member provided for extension in the direction along the circular body, said guide member having a receiving groove;

a frame to which said guide member is fixed so that the receiving groove faces said engagement groove, said frame having a load receiving plate member, and said guide member fixed to a position which faces said engagement groove on an upper surface of the plate;

a plurality of balls for supporting the circular body and disposed between said plates and said guide member to be brought into contact with walls constituting said engagement groove and the receiving groove;

a circulation groove for rotating and circulating said plurality of balls, said circulation groove being connected to said engagement groove and the receiving groove; and power transmitting means for transmitting power to said chaining means to circulate the circular body.

2. The plate circulator according to claim 1, wherein said plurality of plates has a longer length than a width of a tire and has a width which does not get into grooves of a tread pattern of the tire.

3. The plate circulator according to claim 1, wherein said power transmitting means is a sprocket, said chaining means is a chain which is wound around the sprocket, and the chain is circulated according to the rotation of the sprocket.

4. The plate circulator according to claim 1, wherein a plate guide is mounted to each plate of said plurality of plates, and said engagement groove is provided to the plate guide.

5. The plate circulator according to claim 1, wherein said plurality of balls are made of steel and are formed so as to have the same size.

6. A plate circulator comprising:

a plurality of plates;

chaining means for forming a circular body by connecting the plurality of plates in parallel for circulation;

an engagement groove provided to a surface of each plate in the circular body to be extended in a direction along the circular body, said engagement groove having a V-shaped cross section;

a guide member provided for extension in the direction along the circular body, said guide member having a receiving groove having a V-shaped cross section;

a frame to which said guide member is fixed so that the receiving groove faces said engagement groove, the frame having a load receiving plate member, said guide member fixed to a position which faces said engagement groove on an upper surface of the load receiving plate member, and said engagement groove and the receiving groove are formed so as to have a V-shape with an angle of 90°;

a plurality of balls for supporting the circular body and disposed between said plates and said guide member to be brought into contact with walls constituting said engagement groove and the receiving groove;

a circulation groove for rotating and circulating said plurality of balls, said circulation groove being connected to said engagement groove and the receiving groove; and power transmitting means for transmitting power to said chaining means so as to circulate the circular body.

7. The plate circulator according to claim 1, wherein said frame has a load receiving plate member on which a rectangular groove is formed, passage-forming members, each having an U-shaped groove which connects a passage between said engagement groove and the receiving groove and the passage of the rectangular groove, are positioned respectively on the forward and backward ends of the load receiving plate member, and said circulation groove is formed by the rectangular groove and the U-shaped groove.

8. The plate circulator according to claim 1, wherein said power transmitting means is composed of two sprockets provided to each driving shaft of a pair of driving shafts, and the sprockets on one of the driving shafts are positioned so as to face the sprockets on the other of the driving shafts.

9. The plate circulator according to claim 6, wherein said plurality of balls are made of steel and are formed so as to have the same size, and said balls are disposed between the engagement groove and the receiving groove which are formed in a V-shape.

10. The plate circulator according to claim 6, wherein said engagement groove and the receiving groove are formed so as to have a V-shape with an angle of 90°.

11. The plate circulator according to claim 6, wherein a plate guide is mounted to each plate of said plurality of plates, and said engagement groove having the V-shaped cross section is provided to the plate guide.

12. A force measuring apparatus comprising:

a plurality of plates;

chaining means for forming a circular body by connecting the plurality of plates in parallel for circulation;

an engagement groove provided to a surface of each plate in the circular body to be extended in a direction along the circular body;

a guide member provided to be extended in the direction along the circular body, said guide member having a receiving groove;

a frame to which said guide member is fixed so that the receiving groove faces said engagement groove;

a plurality of balls for supporting the circular body and disposed between said plates and said guide member to be brought into contact with walls constituting said engagement groove and the receiving groove;

a circulation groove for rotating and circulating said plurality of balls, said circulation groove being connected to said engagement groove and the receiving groove;

power transmitting means for transmitting power to said chaining means to circulate the circular body; and a force sensor for detecting a force to be transmitted from said plates to said frame, said force sensor being provided to a lower portion of said frame.

13. The force measuring apparatus according to claim 10, wherein said force sensor has a force detecting element which is capable of detecting a load.

14. The force measuring apparatus according to claim 10, wherein said frame has a load receiving plate member on which a rectangular groove is formed, passage forming members, each having an U-shaped groove which connects a passage between said engagement groove and the receiving groove and a passage of the rectangular groove, are provided respectively to forward and backward ends of the load receiving plate member, and said circulation groove is formed by the rectangular groove and the U-shaped groove.

15. The force measuring apparatus according to claim 10, wherein said plurality of plates has a longer length than a width of a tire, and has a width which does not get into a groove of a tread pattern of the tire.

16. The force measuring apparatus according to claim 10, wherein said power transmitting means is a sprocket, said chaining means is a chain which is wound around the sprocket, and the chain is circulated according to the rotation of the sprocket.

17. The force measuring apparatus according to claim 10, wherein said engagement groove and the receiving groove has a V-shaped cross section.

18. The force measuring apparatus according to claim 10, wherein said plurality of balls are made of steel and are formed so as to have the same size.

* * * * *